United States Patent [19]

Odozynski

[11] Patent Number: 4,584,605
[45] Date of Patent: Apr. 22, 1986

[54] DIGITAL HYSTERESIS FOR VIDEO MEASUREMENT AND PROCESSING SYSTEM

[75] Inventor: John A. Odozynski, Topsfield, Mass.

[73] Assignee: GTE Communication Systems Corporation, Stamford, Conn.

[21] Appl. No.: 548,113

[22] Filed: Nov. 2, 1983

[51] Int. Cl.$^4$ .............................................. H04N 7/18
[52] U.S. Cl. .................................... 358/107; 328/115; 307/354; 358/160; 358/282; 377/24
[58] Field of Search ............... 358/106, 107, 160, 280, 358/282; 307/354; 328/115; 377/24

[56] References Cited

U.S. PATENT DOCUMENTS

| | | | |
|---|---|---|---|
| 4,133,008 | 1/1979 | Tisue | 358/282 |
| 4,329,717 | 5/1982 | Logie | 358/282 |
| 4,516,042 | 5/1985 | Nakamura | 358/172 |

Primary Examiner—Howard W. Britton
Attorney, Agent, or Firm—John A. Odozynski

[57] ABSTRACT

In a signal measurement or processing system, specifically in a system which contemplates measurement or processing of video information and which is particularly adapted for use with microprocessors or microcomputers characterized by modest memory capacity and computational capability, a digital hysteresis circuit that enhances the quantization of an analog video signal. The hysteresis circuit is part of a transition detector that quantizes the brightness component of a composite video signal level into mutually exclusive and exhaustive BLACK and WHITE levels determined with regard to a THRESHOLD level. The THRESHOLD is established by applying a REFERENCE voltage, derived from the peak amplitude of the video signal, to a reference input of a D/A. The THRESHOLD is then established as a predetermined percentage of the REFERENCE voltage, as determined by a multibit digital CONTROL signal applied to the CONTROL input of the D/A. Digital hysteresis is effected by adding or subtracting appropriate digital bits from the primary digital control signal subsequent to WHITE-TO-BLACK and BLACK-TO-WHITE transistions, respectively, in the video signal. In a specific embodiment the circuit includes a digital substractor and adder to form the desired resultant digital control signals and a multiplexer to couple the resultant to the CONTROL input of the D/A.

18 Claims, 3 Drawing Figures

DIGITAL HYSTERESIS FOR VIDEO MEASUREMENT AND PROCESSING SYSTEM

FIELD OF THE INVENTION

The invention relates to video measurement and processing systems and, more particularly, to the digital encoding of a video signal in a manner rendering the signal amenable to transfer to and processing by a computing machine, the encoding scheme incorporating digital hysteresis so as to enhance quantization of the video signal.

BACKGROUND OF THE INVENTION

Heretofore, video processing systems for quantizing, encoding and otherwise preconditioning video signals, from whatever source, prior to transfer to and manipulation by digital computers have predominantly been of the genre classifiable as "frame grabber". The operation of a frame grabber is such that each horizontal line is scanned by, for example, a video camera or similar transducer and analytically subdivided into, typically, several hundred picture elements, the picture elements commonly referred to as "pixels". The average brightness level of each pixel is represented by an analog voltage which is in turn quantized by an analog-to-digital converter (A/D) so as to render the gray scale level, a measure of the proportional brightness of that pixel, amenable to storage and processing via a computer.

Although offering a substantial amount of quantitive information regarding the image scanned by the video camera, the frame grabbing technique suffers as an inherently slow and expensive approach to video data acquisition. The drawback is largely attributable to the requirement to process approximately $10^5$ pixels per frame of video information. Relatively sophisticated and commensurately expensive hardware is required to digitally encode the analog signal representing the brightness level of each pixel and thereafter transfer into memory the information so encoded. Furthermore, the technique necessitates the use of a relatively powerful, in terms of both storage as well as a computational capacity, computing mechanism in order to process the video data so acquired in anything approaching real time applications.

U.S. Pat. No. 4,533,944, filed Nov. 2, 1983 and entitled "Video Measurement System for Microcomputer", to John E. Eby and Charles M. Kingston, (Ser. No. 548,112) is directed to video processing system that represents a substantially simplified approach to video data acquisition. Although not generally capable of delivering quite the level of quantitive information as the frame grabber described above, it has proved entirely adequate in a broad range of applications involving dimensional measurements. For example, the invention has demonstrated utility in measuring the inside and outside diameters of quartz tubes in a production process.

Furthermore, the invention requires a modest amount relatively less sophisticated circuitry in order to implement the interface of the video transducer (e.g., camera) to a computer. In addition, because the memory and computational demands are relaxed, it has been found possible to use relatively inexpensive microprocessors in time measurement and control applicatinos otherwise requiring more sophisticated computers.

The subject invention represents an embellishment of the above in that it enhances the manner in which the video signal is intermediately processed by the video measurement system prior to the transfer of data to the microprocessor.

DISCLOSURE OF THE INVENTION

The above and other objects, advantages and capabilities are achieved in one aspect of the invention by a digital hysteresis circuit for a video measurement system, the system itself especially suited for use with a microcomputer or microprocessor. The measurement system quantizes video information developed by, for example, a camera and presents the quantized information in a form amenable to transfer to and manipulation by the microprocessor.

The system includes a transition detector that indicates the occurrence WHITE-TO-BLACK and BLACK-TO-WHITE transitions in a video image as the image is horizontally scanned. The number of transitions is recorded by a feature counter and made available to the microprocessor via a multiplexer/ buss. A decoder driven by the feature counter selectively enables a series of feature timers, the feature timers used to measure the respective time intervals between selected successive transitions and, therefore, the linear dimension of the features.

The transition detector develops a REFERENCE voltage from an analog input signal. The REFERENCE voltage is coupled to one input of a D/A and a digital CONTROL signal to another so that a THRESHOLD signal is provided at the D/A output, the THRESHOLD signal equivalent to a predetermined percentage of the REFERENCE voltage, as determined by the digital CONTROL signal. A comparator sensitive to the relative amplitudes of the input signal and the THRESHOLD provides a pulse train with edges at (W/B) and (B/W) transition points.

The subject digital hysteresis circuit is coupled to the comparator output and operates so as to at least momentarily vary the THRESHOLD level immediately subsequent a transition. In particular, the hysteresis circuit has a first input for a primary digital control signal (A), a second input for a digital hysteresis signal (B), and a multibit output coupled to the CONTROL input of the D/A. The circuit, in effect, adds (A) and (B) to form (A+B) and substracts (B) from (A) to form (A−B). The resultants, (A+B) and (A−B), are appropriately multiplexed so that the CONTROL signal assumes the value (A+B) at least momentarily subsequent (W/B) transitions, (A−B) at least momentarily subsequent (B/W) transitions, and (A) otherwise.

DETAILED DESCRIPTION OF THE INVENTION

Figure 1:
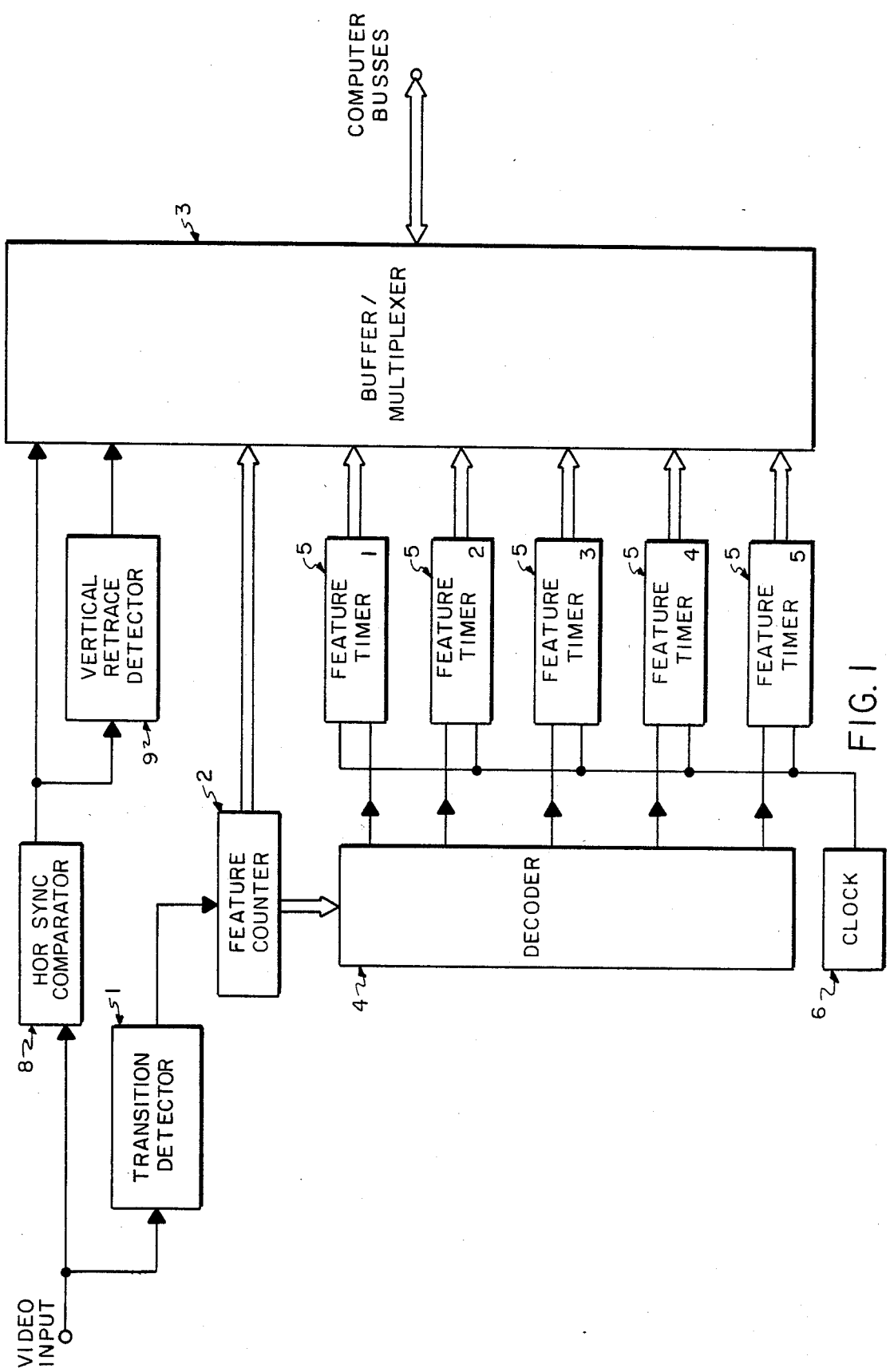
FIG. 1 is a block diagram of the video measurement system.

Referring now to FIG. 1, circuitry contemplated by the subject invention includes a transition detector 1 that can be generally understood to operate so as to quantize a video image into two levels, WHITE or BLACK, and to detect and indicate the occurrence of BLACK-TO-WHITE (B/W) and WHITE-TO- BLACK (W/B) transitions in the image. The operation of transition detector will be described in detail below. For now let it suffice to note that the transition detector has an input adapted to be coupled to a source of video information, e.g., a camera. The transition detector produces at its output a pulse upon the occurrence of each transition in the video input as the image is repeatedly scanned in the horizontal direction.

The pulses at the output of the transition detector are accummulated in a feature counter 2. The feature counter has a first output coupled through a buffer/multiplexer 3 to a microcomputer buss. This output is a measure of the running total of transitions that have occurred during a particular horizontal scanning period. A second output of the feature counter is coupled to an input of a decoder 4.

In particular, the decoder is a ONE-OF-N decoder having N available outputs. For example, assuming that the feature counter is a four-bit binary counter, then the decoder would appropriately be a ONE-OF-SIXTEEN decoder so that a specified logic level, e.g., a logic level ONE, appears at one of its sixteen possible outputs in response to one of the sixteen possible output states of the feature counter. The logic level can serve to ENABLE one of a total of sixteen possible feature timers 5. Each of the feature timers, five are shown in FIG. 1, may assume the form of a binary counter having an ENABLE input coupled to a decoder output and a CLOCK input coupled to a clock 6.

Operation of the feature counter is as follows. As each transition in the video image occurs, the feature counter changes state so that an ENABLE signal appears at successive outputs of the decoder. The N decoder outputs may be hardwired to the ENABLE inputs of N features timers. Alternatively, selected outputs of the decoder may be wired to M, where M is less than N, respective selected feature timers. In this manner the video processing system will operate so as to perform measurements on only M features.

A typical measurement envisioned by the invention is a linear dimension of an object scanned by the camera. The clock provides a constant-frequency, periodic signal to each timer. The timers are in turn enabled, and therefore count, for a length of time corresponding to the specific feature scanned. As a result, the individual feature timers provide an output to the microprocessor, through the buffer/multiplexer, corresponding to the linear dimension of the feature selected. For example, in a specific embodiment, the video processing system is used to measure the inner diameter and the outer diameter of the end of a quartz tube.

Figure 2:
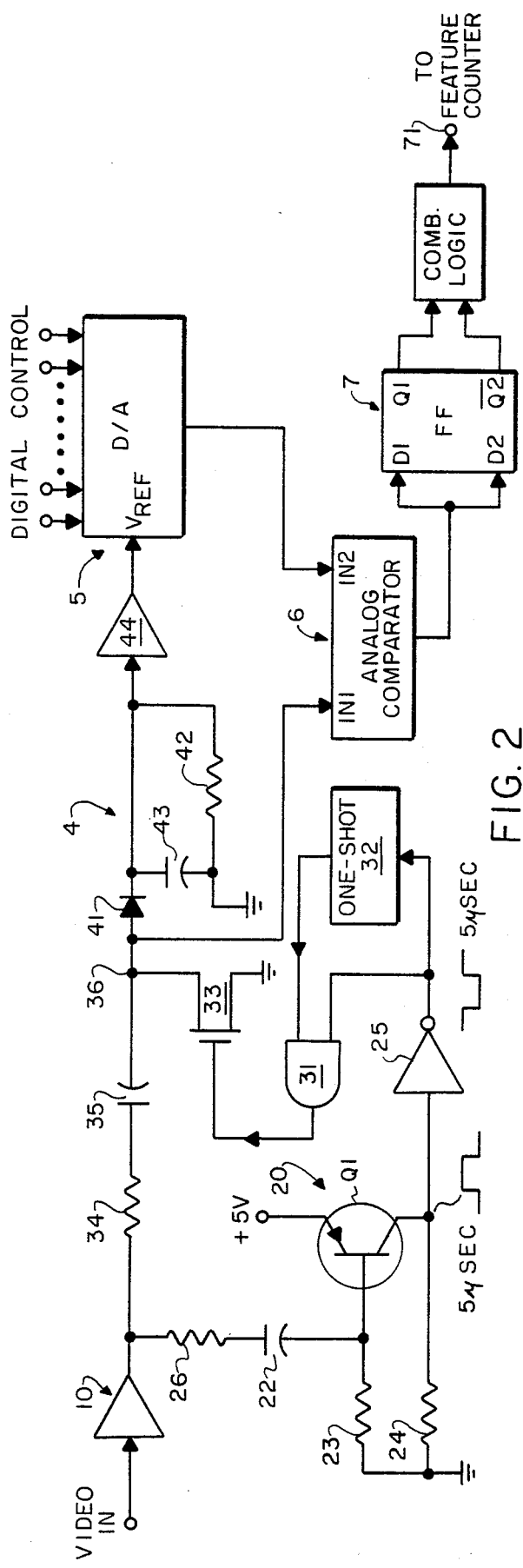
FIG. 2 is a detailed representation of the transition detector.

An essential component of the video measurement system is the transition detector, illustrated in detail in FIG. 2. The transition detector includes a buffer amplifier 10 having an input adapted to be coupled to the source of video information, e.g., camera. The output of buffer 10 is coupled to a pulse generator 20.

The pulse generator includes a PNP transistor Q1 having a base coupled through resistor 26 and capacitor 22 to the output of buffer amplifier 10 and coupled through resistor 23 to circuit ground. The emitter of transistor Q1 is coupled to a 5-volt supply, while its collector is coupled to ground through resistor 24. The output of amplifier 10 is AC-coupled, roughly differentiated, so that Q1 is rendered conductive only during the occurrence of negative-going, horizontal sync pulses in the composite video signal. The pulse generator provides a 5 usecond, positive-going STROBE pulse at the collector of transistor Q1.

The STROBE pulse is applied to an inverter 25 and a negative-going, complementary $\overline{\text{STROBE}}$ pulse applied to one input of AND gate 31. AND gate 31 may be viewed as one element of a clamping circuit 3 that also includes a ONE-SHOT 32 and FET 33. The $\overline{\text{STROBE}}$ pulse is applied to and triggers the ONE-SHOT so that a 9 usecond pulse is developed at the other input of AND gate 31. The leading edge of the pulse provided by the ONE-SHOT roughly coincides with the leading edge of the $\overline{\text{STROBE}}$ pulse. The output of the AND gate is therefore a CLAMP pulse roughly coincident with the "back porch" following the horizontal sync pulse. The CLAMP pulse is applied to the gate of FET 33 having a drain coupled through a resistor 34 and capacitor 35 to the output of buffer amplifier 10. The source of FET 33 is connected to circuit ground. As a result the signal at terminal 36 is a composite video signal having a horizontal "back porch" clamped to ground. The clamping action removes any drift in the DC level of the composite video signal.

The clamped composite video signal at terminal 36 is coupled to a peak detector 4 and also to one input of a comparator 6. The peak detector includes a diode 41 having an anode coupled to terminal 36 and a cathode coupled to a long time-constant, RC network including a parallel-connected resistor 42 and capacitor 43. As a result the signal at the input to buffer amplifier 44 approximates a DC voltage corresponding to (actually one diode drop less than) the peak WHITE level in the video image. The output of buffer amplifier 44 is coupled to the REFERENCE input of a Digital-to-Analog Converter (D/A) 5.

The D/A operates as a multiplier, under control of the microprocessor, so that the voltage at its output is a predetermined percentage of the voltage applied at its REFERENCE input, that is, a predetermined fraction of the peak video signal. The predetermined percentage is established by the multibit digital signal applied to the D/A CONTROL input. The resulting output voltage, which may be termed a THRESHOLD voltage, is applied to one input of a comparator 6, the comparator having the instantaneous, clamped video signal applied to its other input.

The operation of the comparator is such that it provides a logic level ONE at its output when the clamped video signal is greater than the THRESHOLD and a logic level ZERO when it is less than the THRESHOLD. The comparator output is applied to both inputs of a dual D-type flip-flop 7 and the outputs of the flip-flop combined so that a pulse appears at terminal 71 each time a BLACK-TO-WHITE or WHITE-TO-BLACK transition occurs.

Figure 3:
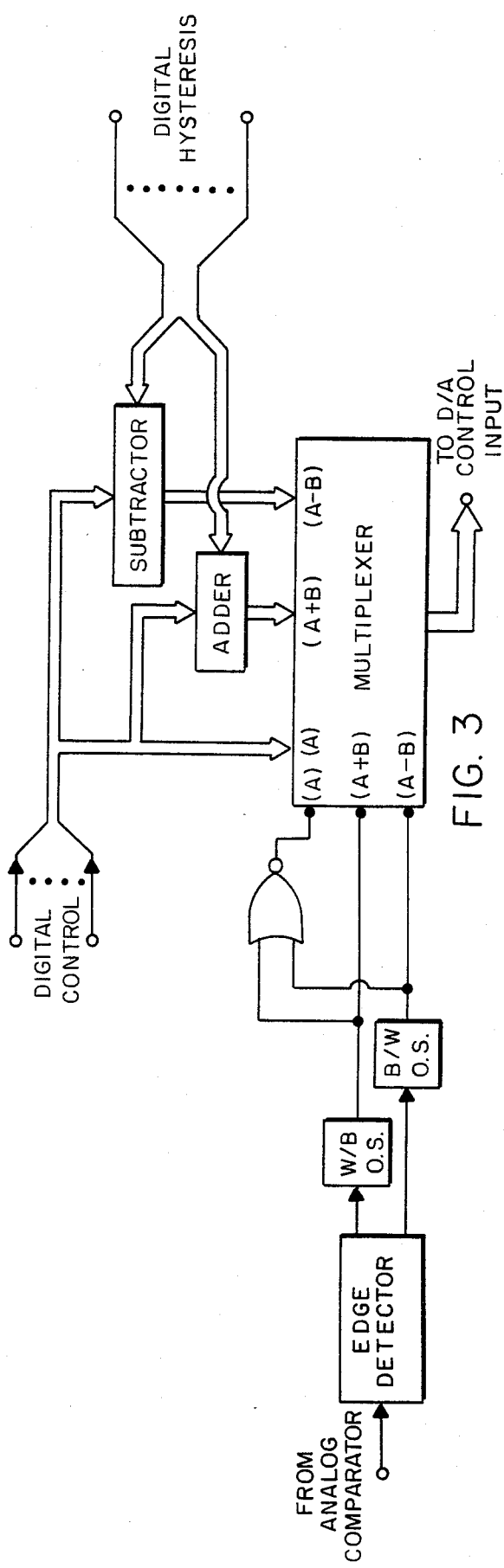
FIG. 3 is a detailed representation of the subject digital hysteresis circuit.

The transition detector may also be provided with a degree of hysteresis via a digital hysteresis circuit shown in FIG. 3. The hysteresis circuit operates to raise the THRESHOLD level a predetermined amount subsequent (W/B) transitions and accordingly to lower the THRESHOLD subsequent (B/W) transitions. The hysteresis circuit in a well known fashion thereby enhances the stability and noise immunity of the transition detector in the vicinity of a transition.

In general, the hysteresis circuit operates so as either to add, subsequent a (W/B) transition, a digital hystersis signal (B) to a primary digital control signal (A) thereby forming a control signal (A+B) or to substract, subsequent a (B/W) transition, (B) from (A) so as to form (A−B). (A+B) is applied to the CONTROL input of the D/A for at least a momentary period after a (W/B) transition, (A−B) for at least a momentary period after a (B/W) transition, and (A) otherwise.

As indicated in FIG. 3, the digital hysteresis circuit includes a digital adder 1 and a digital substractor 2, each having the primary digital control signal (A) and the digital hysteresis signal (B) as inputs. The adder and substractor generate digital resultants (A+B) and (A−B), respectively. The resultants (A+B) and (A−B), as well as the primary digital control signal (A) are coupled to a inputs of a digital multiplexer 3. The multiplexer accordingly determines which of those signals is applied to the CONTROL input of the D/A.

In particular, the output of the analog comparator (See FIG. 2) is coupled to an edge detector 4. Operation of the edge detector is such that falling edges, corresponding to (W/B) transitions, in the comparator pulse train trigger a (W/B) ONE-SHOT, 5, and rising edges, corresponding to (B/W) transitions, trigger a (B/W) ONE-SHOT 6. The respective positive-pulse output of the one shots are coupled to (A−B) SELECT and (A+B) SELECT terminals of the mulitiplexer, as shown in FIG. 3. The outputs of the one-shots are also combined in a NOR gate 7 and applied to the (A) SELECT terminal of the multiplexer. The application of a logic level ONE to the respective SELECT inputs of the multiplexer is to be understood as causing the corresponding input signal (A), (A+B) or (A−B) to be coupled through the multiplexer to the CONTROL input of the D/A.

In the quiescent state, that is, at any time prior to the next transition and after the immediately preceding transition by a duration exceeding the maximum pulse width of the one-shots, the digital signal at the CONTROL input will be (A). Immediately after a (W/B) transition the CONTROL input will be (A+B) and the THRESHOLD level will be raised an amount attributable to the digital hystersis signal (B). After (B/W) transitions the THRESHOLD levels will be lowered by an amount similarly attributable to (B). The hysteresis in the THRESHOLD level will persist for durations determined by the pulse widths of the respective (B/W) and (W/B) ONE SHOTS.

As shown in FIG. 1, the horizontal sync and vertical retrace signals are extracted from the composite video signal by a horizontal sync separator and a vertical retrace detector 9 respectively. These signals are used to control the transfer of information to the microprocessor, via buffer/multiplexer 3, in the following manner. Upon the occurrence of a horizontal sync pulse, data derived during the immediately preceeding horizontal scanning period, as represented by the contents of the feature counter and feature timers, is transferred to the buffer/multiplexer. These devices are then concomitantly reset in anticipation of the next horizontal scanning sequence. The vertical retrace signals are used to indicate that data corresponding to a complete frame has been acquired, typically requiring approximately two hundred and fifty horizontal scans. In a video measurement system such as configured in FIG. 1, each horizontal scanning sequence requires the transfer of six words of words of data into the microprocessor memory, for a maximum data acquisition of fifteen hundred words per frame. This compares extremely favorably with the fifty to a hundred thousand words required by "frame grabbers" alluded to above.

To reiterate what has been described above, the subject video measurement system is unique in that it quantifies the video information into two pixel levels: BLACK and WHITE, a WHITE level being defined as any brightness level above a predetermined percentage of the peak brightness level and a BLACK level being defined as any level below the predetermined percentage. As each horizontal line is scanned B/W and W/B transitions are detected and counted. The system counts the total number of transitions in a scanning period and measures the time duration between transitions. Features, defined as individual pixel elements between transitions, can then be measured according to their time duration. Because the horizontal scanning period is known, the duration of each pixel can be converted to a dimensional length. The analysis of data so acquired and stored takes place under program control as established by the particular application to which the measurement system is addressed.

This system provides a much simplified form of data acquisition which, while providing limited information, is nevertheless completely adequate for a large set of dimensional measurement applications. In adddition to employing much less complex hardware for the interface to the computer, the data processing load is sufficiently attenuated to allow an inexpensive microprocessor to be used in real time measurement and control applications.

Accordingly while there has been disclosed and described what at present is deemed to be a preferred video measurement system, it will be obvious to those having ordinary skill in the art that various changes and modifications may be made therein without departing from the scope of the invention as defined by the appended claims.

INDUSTRIAL APPLICABILITY

The subject invention is useful in video measurement applications and is particularly suited to programmed dimensional analysis.

What is claimed is:

1. In a signal processing system including circuitry for developing a REFERENCE voltage derived from an input signal, a D/A converter having the REFERENCE signal applied to a REFERENCE input and a multibit digital CONTROL signal applied to a CONTROL input so as to develop a THRESHOLD signal at an output, said THRESHOLD signal equivalent to a predetermined fraction of the REFERENCE signal as determined by the CONTROL signal, and a comparator sensitive to the relative amplitudes of the input signal and the THRESHOLD signal:

A digital hysteresis circuit coupled to an output of the comparator for at least momentarily varying the THRESHOLD signal in response to transitions in the input signal, a transition herein regarded as a point at which the input signal becomes either greater than the then existing THRESHOLD signal, that is, a (B/W) transition, or less than the then existing THRESHOLD signal, that is, a (W/B) transition.

2. A digital hysteresis circuit as defined in claim 1 and comprising a first input for a primary digital control signal (A), a second input for a digital hystersis signal (B) and an output coupled to the CONTROL input of the D/A, the output generally assuming the value (A) but at least momentarily assuming the value (A+B) in response to (W/B) transitions and at least momentarily assuming the value (A−B) in response to (B/W) transitions.

3. A digital hysteresis circuit as defined in claim 2 comprising:
means for digitally adding (A) and (B) to form (A+B),
means for digitally subtracting (B) from (A) to form (A−B), and
multiplexing means responsive to transitions in the input signal for providing at the output of the digital hysteresis circuit a digital CONTROL signal to the D/A, the CONTROL signal equal to (A+B) at least momentarily subsequent (W/B) transitions, equal to (A−B) at least momentarily subsequent (B/W) transitions, and equal to (A) otherwise.

4. In a signal processing system including circuitry for developing a REFERENCE voltage derived from an input signal, a D/A converter having the RFERENCE signal applied to a REFERENCE input, and a multibit digital CONTROL signal applied to a CONTROL input so as to develop a THRESHOLD signal at an output, said THRESHOLD signal equivalent to a predetermined fraction of the REFERENCE signal as determined by the CONTROL signal, and including a comparator sensitive to the relative amplitudes of the input signal and the THRESHOLD signal, a digital hysteresis circuit coupled to an output of the comparator for varying, at least for a momentary period, the THRESHOLD signal in response to transitions in the input signal, a transition herein regarded as a point at which the input signal becomes either greater than the then existing THRESHOLD signal, that is, a (B/W) transtion, or less than the then existing THRESHOLD signal, that is, a (W/B) transition, the digital hysteresis circuit comprising:
a first input for a primary digital control signal (A),
a second input for a digital hysteresis signal (B), and
an output coupled to the CONTROL input of the D/A,
the output generally assuming the value (A+B) in response to (W/B) transitions and at least momentarily assuming the value (A−B) in response to (B/W) transitions.

5. A digital hysteresis circuit as defined in claim 4 and comprising a multiplexer responsive to transitions in the input signal so as to apply an appropriate digital CONTROL signal to the CONTROL input of the D/A, the CONTROL signal as specified in claim 4.

6. A digital hysteresis circuit as defined in claim 5 wherein the multiplexer has a terminal for the application of a signal operative to select a CONTROL signal assuming the value (A), a terminal for the application of a signal operative to select a CONTROL signal assuming the value (A+B), and a terminal for the application of a signal operative to select a CONTROL signal assuming the value (A−B).

7. A digital hysteresis cirucit as defined in claim 6 and comrising an edge detector for coupling to the comparator and for providing an edge detector signal at its output in response to transitions in the input signal, said edge detector signal of a form calculated to differentiate between (W/B) and (B/W) transitions.

8. A digital hysteresis circuit as defined in claim 7 and comprising a (W/B) ONE-SHOT coupled between the edge detector and the multiplexer for the developing a signal operative to select a CONTROL signal assuming the value (A+B) in response to (W/B) transitions in the input signal.

9. A digital hysteresis circuit as defined in claim 8 and comprising a logic gate coupled between the (W/B) ONE-SHOT and the multiplexer for developing a signal operative to select a CONTROL signal assuming the value (A) during a quiescent state.

10. A digital hysteresis circuit as defined in claim 7 and comprising a (B/W) ONE-SHOT coupled between the edge detector and the multiplexer for developing a signal operative to select a CONTROL signal assuming the value (A−B) in response to (B/W) transitions in the input signal.

11. A digital hysteresis circuit as defined in claim 10 and comprising a logic gate coupled between the (B/W) ONE-SHOT and the multiplexer for developing a signal operative to select a CONTROL signal assuming the value (A) during a quiescent state.

12. A digital hysteresis circuit as defined in claim 4 and comprising:
a digital adder to add (A) and (B) to form (A+B),
a digital subtractor to substract (B) from (A) to form (A−B), and
a multiplexer having inputs coupled to the respective (A), (A+B) and (A−B) digital signals, said multiplexer responsive to transitions in the input signal so as to apply an appropriate digital CONTROL signal to CONTROL input of the D/A, the CONTROL signal as specified in claim 4.

13. A digital hysteresis circuit as defined in claim 12 wherein the multiplexer has a terminal for the application of a signal operative to select a CONTROL signal assuming the value (A), a terminal for the application of a signal operative to select a CONTROL signal assuming the value (A+B), and a terminal for the application of a signal operative to select a CONTROL signal assuming the value (A−B).

14. A digital hysteresis circuit as defined in claim 13 and comprising an edge detector for coupling to the comparator and providing a signal of its output in response to transtions in the input signal, said edge detector signal of a form calculated to differentiate betweeen (W/B) and (B/W) transitions.

15. A digital hysteresis circuit as defined in claim 14 and comprising a (W/B) ONE-SHOT coupled between the edge detector and the multiplexer for developing a signal operative to select a CONTROL signal assuming the value (A+B) in response to (W/B) transitions in the input signal.

16. A digital hysteresis circuit as defined in claim 15 and comprising a logic gate coupled between the (W/B) ONE-SHOT and the multiplexer for developing a signal operative to select a CONTROL signal assuming the value (A) during a quiescent state.

17. A digital hysteresis circuit as defined in claim 14 and comprising a (B/W) ONE-SHOT coupled between the edge detector and the multiplexer for developing a signal operative to select a CONTROL signal assuming the value (A−B) in response to (B/W) transitions in the input signal.

18. A digital hysteresis circuit as defined in claim 17 and comprising a logic gate coupled between the (B/W) ONE-SHOT and the multiplexer for developing a signal operative to select a CONTROL signal assuming the value (A) during a quiescent state.

* * * * *